US006937581B1

(12) United States Patent
Berger et al.

(10) Patent No.: US 6,937,581 B1
(45) Date of Patent: Aug. 30, 2005

(54) SWITCHING DEVICE AND METHOD FOR PARALLEL CONNECTION OF SUBSCRIBER TERMINAL DEVICES

(75) Inventors: Harald Berger, Paderborn (DE); Markus Jabs, Lichtenau (DE); Gerhard Scharfen, Wuennenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/527,140

(22) Filed: Mar. 16, 2000

(30) Foreign Application Priority Data

Mar. 16, 1999 (DE) ................................ 199 11 713

(51) Int. Cl.[7] ............................ H04Q 7/00; H04Q 7/20

(52) U.S. Cl. ...................... 370/328; 370/352; 370/420; 455/412.1; 455/414.1; 455/462

(58) Field of Search ................................ 370/401, 328, 370/352–356, 420; 455/414, 422, 425, 462, 455/555, 412.1–414.1, 415–417

(56) References Cited

U.S. PATENT DOCUMENTS

| | | | | |
|---|---|---|---|---|
| 5,159,626 A * | 10/1992 | Baum et al. | ............. | 379/88.22 |
| 5,274,694 A * | 12/1993 | Lechner et al. | ............. | 455/411 |
| 5,544,226 A * | 8/1996 | Weis et al. | ................. | 455/555 |
| 5,617,467 A * | 4/1997 | Bacher et al. | .............. | 455/466 |
| 5,796,727 A * | 8/1998 | Harrison et al. | | |
| 5,898,924 A * | 4/1999 | Korpi et al. | | |
| 6,141,562 A * | 10/2000 | Eriksson | | |
| 6,151,492 A * | 11/2000 | Melin | | |
| 6,256,512 B1 * | 7/2001 | Verdonk | | |
| 6,330,244 B1 * | 12/2001 | Swartz et al. | | |
| 6,349,212 B1 * | 2/2002 | Martensson et al. | ........ | 455/462 |
| 6,366,771 B1 * | 4/2002 | Angle et al. | | |

FOREIGN PATENT DOCUMENTS

| | | |
|---|---|---|
| DE | 40 30 206 | 3/1992 |
| DE | 195 34 939 | 5/1997 |
| DE | 19752403 | 5/1999 |
| WO | WO 89/11765 | 11/1989 |
| WO | 98/12861 | 3/1998 |

OTHER PUBLICATIONS

614 PTR Philips Telecommunication Review 51 (1993) Dec., No. 3, Eindhoven, NL—New Group Feature Collection for SOPHO-S ISPBXs—Boom et al.

Boom et al., ISDN-TK-Anlage SOPHO-S mit neuen Leistungmerkmalen für Gruppenfunktionen, Phillips Telecommunication Review 51(3), 1993, pp. 10-16.

Boom et al., "New Group Feature Collection for SOPHO-S ISPBXs", 614 PTR Phillips Telecommunication Review 51(3), pp. 10-16 (1993).

"System HICOM 600" Produktschrift, Siemens AG, Munich, 1984.

* cited by examiner

*Primary Examiner*—Frank Duong
*Assistant Examiner*—Melanie Jagannathan
(74) *Attorney, Agent, or Firm*—Staas & Halsey LLP

(57) ABSTRACT

The present invention is directed to a switching device and to a pertaining method for parallel connection of subscriber terminal devices having complex performance features. Subscriber terminal devices connected in parallel are thereby driven in an interface driver via a principal subscriber control and at least one subsidiary subscriber control. Due to the realization of a logical and physical interface between the principal and subsidiary subscriber control, the subscriber terminal devices are connected to one another both connection-oriented as well as with respect to their performance features.

5 Claims, 5 Drawing Sheets

SWITCHING DEVICE AND METHOD FOR PARALLEL CONNECTION OF SUBSCRIBER TERMINAL DEVICES

BACKGROUND OF THE INVENTION

The present invention is directed to a switching device for parallel connection of subscriber terminal devices and to a pertaining method and is particularly directed to a private branch exchange and a pertaining method for parallel connection of subscriber terminal devices.

With the spread of, in particular, cordless subscriber terminal devices such as, for example, DECT telephones, users increasingly have the desire for a parallel connection of these cordless subscriber terminal devices with already existing, wire-bound subscriber terminal devices.

For realizing such an expanded function, for example, a rerouting can be activated at the wire-bound subscriber terminal device, as a result whereof all incoming calls are then only signaled at the cordless subscriber terminal device. In this way, the user can be reached via the cordless subscriber terminal device, whereby rerouting can also be undertaken to other, external subscriber terminal devices. What is disadvantageous about this traditional solution, however, is the relatively complicated procedure for activating or deactivating the call redirection in the wire-bound subscriber terminal device. Further, an incoming call is only signaled at the cordless subscriber terminal device and is no longer signaled at the wire-bound subscriber terminal device.

In some traditional switching devices, further, there is the possibility of connecting subscriber terminal devices connected thereto in parallel in terms of switching technology via what is referred to as a "team solution" or a "hunt group". In this case, incoming calls are simultaneously signaled at all subscriber terminal devices connected in parallel. A complicated activation/deactivation of the above-described call redirection is eliminated in this solution since the calls are automatically signaled at all subscriber terminal devices connected in parallel. What is disadvantageous about this traditional solution, however, is that the respective subscriber terminal devices—dependent on the specific, technical realization—occupy the same or different lines given an outgoing call and, accordingly, are also differently signaled or indicated with the same or different telephone numbers toward the outside.

SUMMARY OF THE INVENTION

The present invention is based on the object of providing a switching device and a method pertaining thereto for parallel connection of subscriber terminal devices that enables enhanced user comfort.

This object is inventively achieved in accordance with the present invention in a switching device for parallel connection of a number of subscriber terminal devices, the switching device including a plug-in module for providing a number of subscriber interfaces each connected to one of the subscriber terminal devices and a control unit. The control unit has a central control unit for controlling central switching events in the switching device and a peripheral control unit for controlling linking of the subscriber interfaces to the subscriber terminal devices. The peripheral control unit has an interface driver for controlling at least two of the subscriber interfaces, the interface driver having a principal or master subscriber control for controlling a principal subscriber terminal device; at least one subsidiary or slave subscriber control for controlling at least one subsidiary subscriber terminal device; a central driver control for central controlling of administration events in the interface driver; a first connection device for physically connecting the principal (master) subscriber control and the at least one subsidiary (slave) subscriber control; and a second connection device for logically connecting the principal (master) subscriber control to the at least one subsidiary (slave) subscriber control.

This object is also inventively achieved in accordance with the present invention in a method for connecting a number of subscriber terminal devices in parallel, said method comprising the steps of: establishing a physical connection of said subscriber terminal devices to be connected in parallel; and establishing a logical connection of said subscriber terminal devices to be connected in parallel.

An interface driver for driving the subscriber interfaces that is present in the peripheral control unit of the switching device thereby has a principal (master) subscriber control for controlling a principal subscriber terminal device as well as at least one subsidiary (slave) subscriber control for controlling at least one subsidiary subscriber terminal device. A first connection connects the principal (master) subscriber control to the at least one subsidiary (slave) subscriber control, as a result whereof all subscriber terminal devices connected in parallel can be reached under the same telephone number and an incoming call is simultaneously signaled at all subscriber terminal devices. Over and above this, a connection is through-connected to the subscriber terminal device that accepts the incoming call. Further, the subscriber terminal devices connected in parallel always occupy the same line, i.e., the line of the principal (master) subscriber control, as a result whereof the telephone number of the principal subscriber terminal device always appears in the display at the called party, even when the call was actuated from a subsidiary subscriber terminal device.

Further, the interface driver has a second connection that logically connects the principal (master) subscriber control to the at least one subsidiary subscriber control. In this way, complex telecommunication performance features of the switching device are processed in parallel for both subscriber terminal devices in addition to the connection control. Stated in more precise terms, a modification of a predetermined performance feature at a subscriber terminal device is simultaneously implemented at all other subscriber devices connected in parallel. The user comfort is thereby extraordinarily improved.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
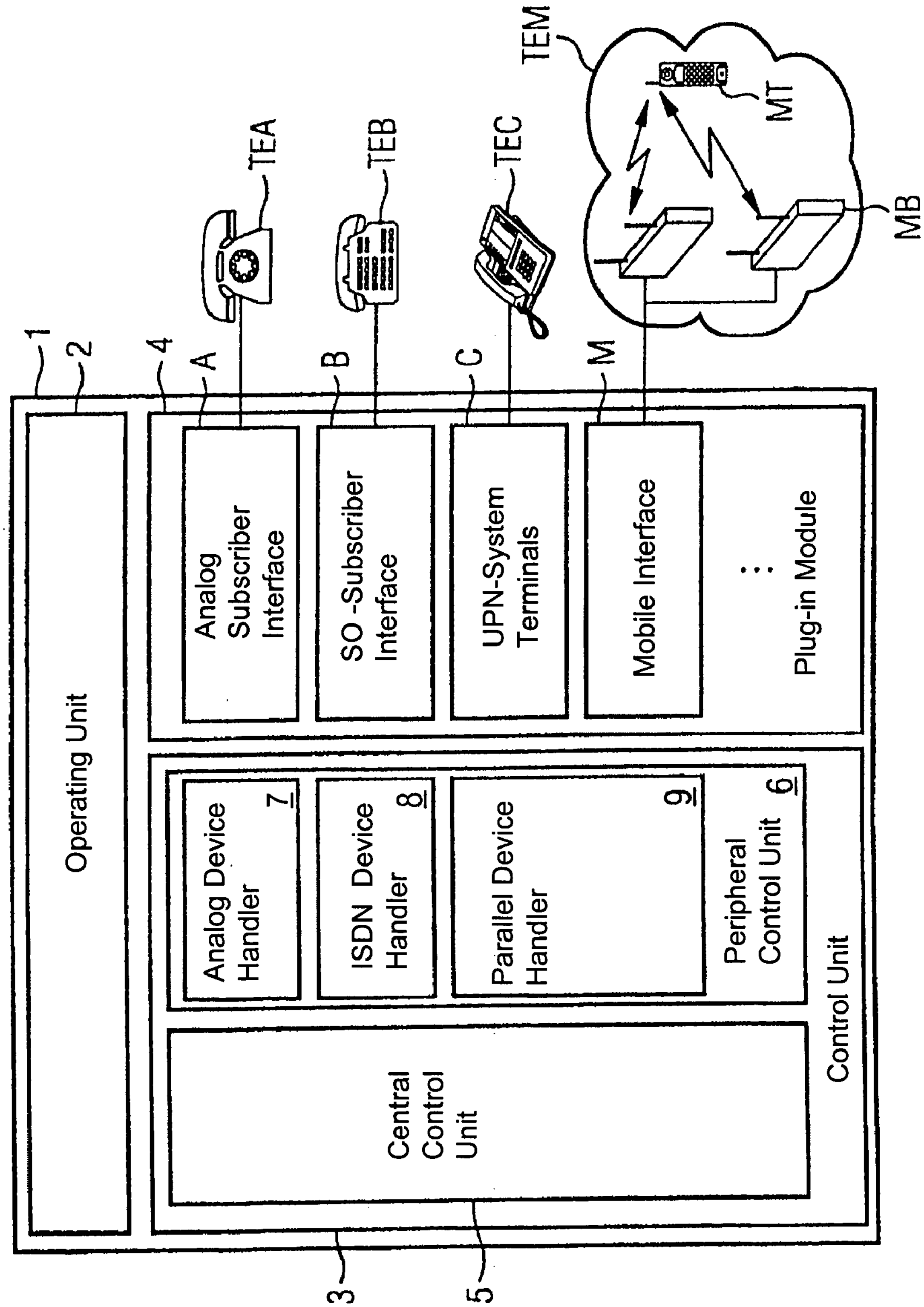
FIG. 1 is a schematic block circuit diagram of a switching device according to the present invention.

As a switching device 1, FIG. 1 shows a private branch exchange to which a number of subscriber terminal devices are connected. Such subscriber terminal devices are, for example, an analog subscriber terminal device TEA, an ISDN subscriber terminal device TEB, a digital system terminal device TEC as well as a cordless subscriber terminal device TEM. In the case of the analog subscriber terminal device TEA and the ISDN subscriber terminal device TEB, the intelligence or realization of the telecommunications performance features are located mainly in the subscriber terminal devices. Compared thereto, the intelligence in the subscribers terminal devices TEC and TEM is located in the private branch exchange 1, whereby complex telecommunications performance features are realized in the private branch exchange 1. According to FIG. 1, the cordless subscriber telephone device system TEM is composed of two base stations MB and of a cordless telephone or subscriber terminal device MT pertaining thereto.

For connection of the various subscriber terminal devices, the private branch exchange 1 has a plug-in module 4 with a number of subscriber interfaces A, B, and M. The subscriber interfaces A, B and M thereby serve for the connection of the illustrated subscriber terminal devices as well as base stations MB for cordless telephones (DECT telephones). Such subscriber interfaces, however, can also serve for the connection of lines to a public exchange and/or for networking.

A control unit 3 is composed of a central control unit 5 and of a peripheral control unit 6. The central control unit 5 serves, among other things, for the control of switching events, assigning authorizations and the like. Compared thereto, the peripheral control unit 6 is responsible for the linking of the various subscriber interfaces A, B, C and M. Further, the peripheral control unit 6 serves the purpose of realizing terminal device-specific use interfaces and various internal telecommunications performance features such as, for example, team functions, caller lists, etc. According to FIG. 1, the peripheral control unit 6 has an interface driver 7 (analog device handler) for driving the analog subscriber interface A or the analog subscriber terminal device TEA. In the same way, an interface driver 8 (ISDN device handler) controls the digital subscriber interface B or the ISDN subscriber terminal device TEB. Further description of these components is foregone below since they are of no significance for the present invention.

By comparison thereto, an interface driver 9 realizes the critical functions for parallel connection of a number of subscriber terminal devices. According to FIG. 1, the parallel connection of the digital system subscriber terminal device TEC with the cordless subscriber terminal device MT via the inventive interface driver 9 is described below.

For controlling and initializing general procedures, the switching device 1 has an operating unit 2 that, as operating technology, coordinates, for example, the allocation of the various subscriber interfaces in the plug-in module 4, implements an initialization of the various blocks, serves for input and programming, and also implements a central administration of general data such as, for example, date and time of day.

Figure 2:
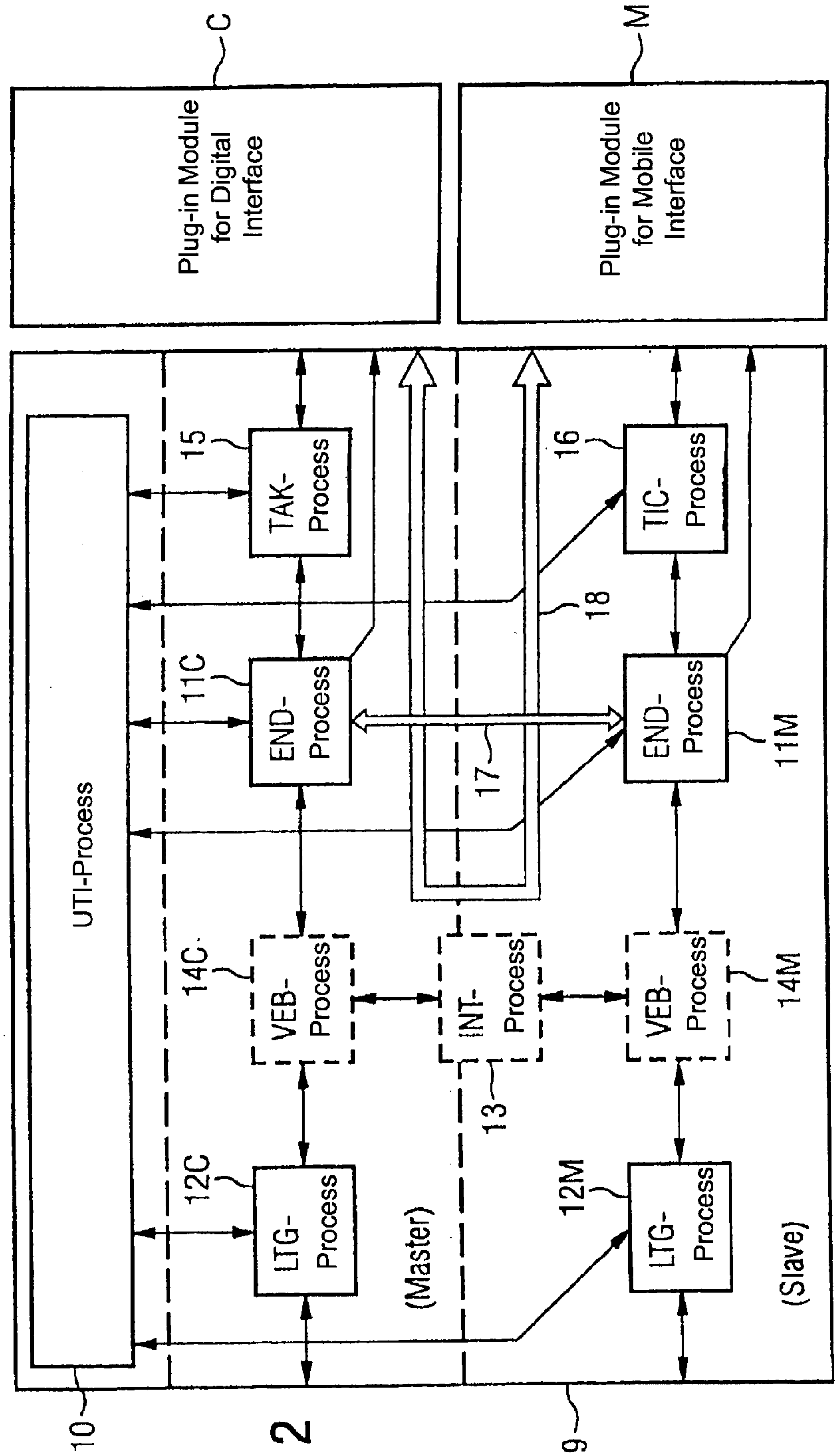
FIG. 2 is a schematic block circuit diagram of an inventive interface driver upon setup of an internal connection.

FIG. 2 shows a schematic block circuit diagram of the inventive interface driver 9 upon setup of an internal connection between the cordless subscriber terminal device MT and the wire-bound subscriber terminal device TEC. The reference character C thereby again indicates the subscriber interface or the plug-in module for a digital system subscriber. The reference character M references the subscriber interface or the plug-in module for a mobile subscriber. According to FIG. 1, the mobile subscriber is a matter of a base station MB with the pertaining cordless telephone MT. The interface driver 9, in FIG. 2, includes a principal subscriber control (master) and a subsidiary subscriber control (slave) that are allocated to the respective subscriber interfaces C and M. The interface driver 9 according to FIG. 2 thus enables the parallel connection of the wire-bound subscriber terminal device TEC with the cordless subscriber terminal device MT. According to FIG. 2, the principal subscriber control is composed of a principal line process unit (LTG process) 12C, a principal connection process unit (VEB process) 14C, a principal terminal device process unit (END process) 11 C, and a principal key converter process unit (TAK process) 15. In a similar way, the subsidiary subscriber control is composed of a subsidiary line process unit (LTG process) 12M, a subsidiary connection process unit (VEB process) 14M, a subsidiary terminal device process unit (END process) 11 M, and a subsidiary key converter process unit (TIC process) 16.

The line process units of the principal and subsidiary subscriber control essentially serve for linking to the central control unit 5 of the switching device 1 as well as for controlling what are referred to as team functions and connections. The connection process units 14C and 14M of the principal and subsidiary subscriber control essentially control the connection setup within the interface driver 9. The terminal device process units 11C and 11M of the principal and subsidiary subscriber control serve for controlling a respective subscriber terminal device and, in particular, for controlling the user interface as well as telecommunications performance features. The terminal equipment process units 11C and 11M thereby generate logical messages for controlling a pertaining subscriber terminal device. Such logical messages can, for example, represent menu structures for the subscriber terminal devices that are deposited in the interface driver 9. The key converter process units 15 and 16 of the principal and subsidiary subscriber control serve for the conversion of the logical messages in the functional messages for direct control of a pertaining subscriber terminal device. Since, according to FIGS. 1 and 2, the principal subscriber terminal device is composed of the digital system subscriber terminal device TEC and the subsidiary subscriber terminal device is the cordless subscriber terminal device MT, the respective user interfaces of the subscriber terminal devices differ significantly from one another. For example, thus, the cordless subscriber terminal device MT has a completely different keyboard and display than the wire-bound subscriber terminal device TEC.

For this reason, the key converter process unit 15 for the digital, wire-bound subscriber terminal device TEC differs from the key converter process unit 16 for the cordless subscriber terminal device MT. Stated in more exact terms, the key converter process unit 15 administers, among other things, the key data of the wire-bound subscriber terminal device TEC and converts the functional messages of a subscriber terminal device (for example, the third function key was pressed) into logical messages (for example, key having the function "mailbox" was pressed). In the opposite direction, the key converter process unit 15 assumes the drive of the user interface (for example, LEDs) of the wire-bound subscriber terminal device TEC. For example, the logical message "switch the key having the key function "mailbox" into the flashing status" is converted into the functional message "switch the third function key to flashing".

Since, for example, such a "third function key" is not present at the cordless subscriber terminal device MT, the key converter process unit 16 for the direct control of the cordless subscriber terminal device MT differs fundamentally from the key converter process unit 15 for direct drive of the wire-bound subscriber terminal device TEC. Stated more exactly, the key converter process unit 16 does not serve for the conversion of the logical messages into functional messages but, over and above this, for linking the cordless subscriber terminal device (TIC, key converter & interworking unit & cordless multicell integration). By using such key converter process units 15 and 16, the different functional messages of the various subscriber terminal devices are converted into a uniform format of logical messages. This enables a realization for direct control of the greatest variety of subscriber terminal devices in various terminal device families given minimal outlay.

For physical connection of the principal (master) subscriber control to the subsidiary (slave) subscriber control, the inventive interface driver 9 has an internal connection process unit 13 that connects the connection process units 14C and 14M of the principal and subsidiary subscriber control to one another. In a similar way, the interface driver 9 has a message interface 17—as second connection device—that logically connects the terminal device process units 11C and 11M of the principal and subsidiary subscriber control to one another. Stated more precisely, the logical messages between the principal (master) subscriber control and the subsidiary (slave) subscriber control are transmitted via this message interface 17, as a result whereof a synchronization of telecommunications performance features can be realized.

For controlling the various process units in the inventive interface driver 9, this has an administration process unit (UTI process) 10. This administration process unit 10 administers all subscriber terminal devices centrally and particularly serves for memory administration, the log on and log off of subscriber terminal devices, a system run up, a busy lamp field control, a team functionality, etc.

In view of what is referred to as the "team functionality", the inventive interface driver 9 offers the two different solutions of "classic team" and "top team". In the "classic team" having up to eight team subscribers or subscriber terminal devices, the lines of a team partner can be directly seized, whereas, in what is referred to as the "top team", up to 64 subscribers or subscriber terminal devices can be present in the team. In the present case, the "classic team solution" of the interface driver 9 is utilized for the connection-related or connection-oriented parallel connections of the subscriber terminal devices TEC and MT, whereby the functionality of the "top team" is additionally available.

In the "classic team solution" of the interface driver 9, it is essentially the process units 12C, 14C, 11C, 13, 12M, 14M and 11M that are employed.

Figure 3:
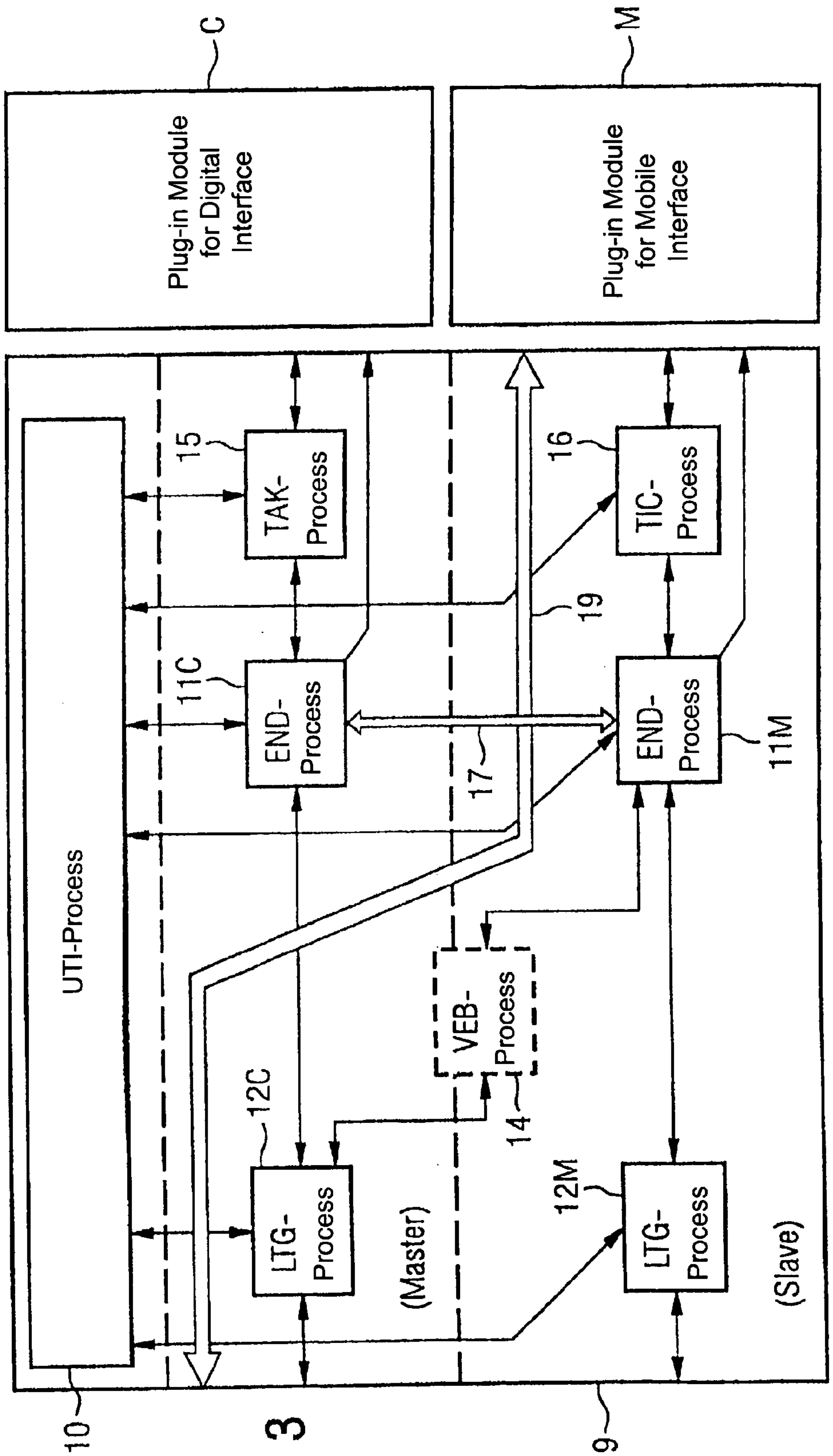
FIG. 3 is a schematic block circuit diagram of the inventive interface driver in the connection-oriented parallel connection.

Whereas an internal connection in the team can be setup with 18 in this way according to FIG. 2, i.e. a connection between the wire-bound subscriber terminal equipment TEC and the cordless subscriber terminal device MT, the basis for the connection-related or connection-oriented parallel connection (physical parallelization) of the subscriber terminal devices TEC and MT is shown in FIG. 3.

FIG. 3 shows a schematic block circuit diagram of the inventive interface driver 9 in the connection-oriented parallel connection of the principal and subsidiary (master and slave) subscriber control. In FIG. 3, identical reference characters reference the same process units or components as in FIG. 2, for which reason a more detailed description is foregone below.

Differing from FIG. 2, the process units 13, 14C and 14M are combined in FIG. 3 to form the connection process unit 14 that, as a first connection device, physically connects the principal subscriber control to the subsidiary subscriber control. According to FIG. 3, the cordless subscriber terminal device (mobile telephone) MT seizes the line of the wire-bound subscriber terminal device TEC, since the principal subscriber control is arranged hierarchically above the subsidiary subscriber control and selects the line of the wire-bound subscriber terminal device TEC with priority. Via a corresponding priority circuit (not shown), however, the hierarchy between the principal subscriber control and the subsidiary subscriber control can be modified, as a result whereof, for example, the line of the cordless subscriber terminal device MT is employed with priority for the connection set up or for signaling the unit's own telephone number.

The logical connection of the principal and subsidiary subscriber control or the parallel connection of the performance features in the private branch exchange 1 ensues, according to FIG. 2, via the message interface 17 established as second connection device that is connected between the terminal device process units 11C and 11M and the subscriber terminal devices TEC and MT, connected in parallel, or their pertaining principal and subsidiary subscriber controls. The two subscriber terminal devices TEC and MT synchronize their local data via this message interface 17. Stated more precisely, the corresponding datum at the subscriber terminal device connected in parallel is modified via this message interface 17 insofar as a relevant modification of data derives in a subscriber terminal device. What is thereby particularly viewed as data are telecommunications performance features.

A selection regarding which performance features of the private branch exchange 1 take effect in parallel for both subscriber terminal devices TEC and MT and which do not take effect can thereby be undertaken via a selection unit (not shown). In this way, the cordless subscriber terminal device MT functions quasi as remote control of the wire-bound subscriber terminal device, whereby, for example, an activation of a call redirection at the cordless subscriber terminal device likewise produces a call redirection at the wire-bound subscriber terminal device and automatically activates a LED corresponding to a pertaining call redirection key thereat and outputs a corresponding text in the display (for example, "to:Koch-29201"). When, on the other hand, a setting of a performance feature is undertaken at the wire-bound subscriber terminal device such as, for example, "station guarding on", then a LED of a corresponding function memory key at the wire-bound subscriber terminal device is, for example, activated and the telecommunication performance feature "station guarding" is activated for the two subscriber terminal devices connected in parallel, i.e. calls are no longer delivered. When, after the performance feature "station guarding" has been activated, a corresponding menu is opened at the cordless subscriber terminal device MT, then it is displayed thereat that the performance feature "station guarding" was activated. In the same way, the deactivation of a telecommunications performance feature can be implemented both from the wire-bound as well as from the cordless subscriber terminal device TEC and MT.

The synchronization of telecommunications performance features given subscriber terminal devices connected in parallel is described in greater detail below.

Figure 4:
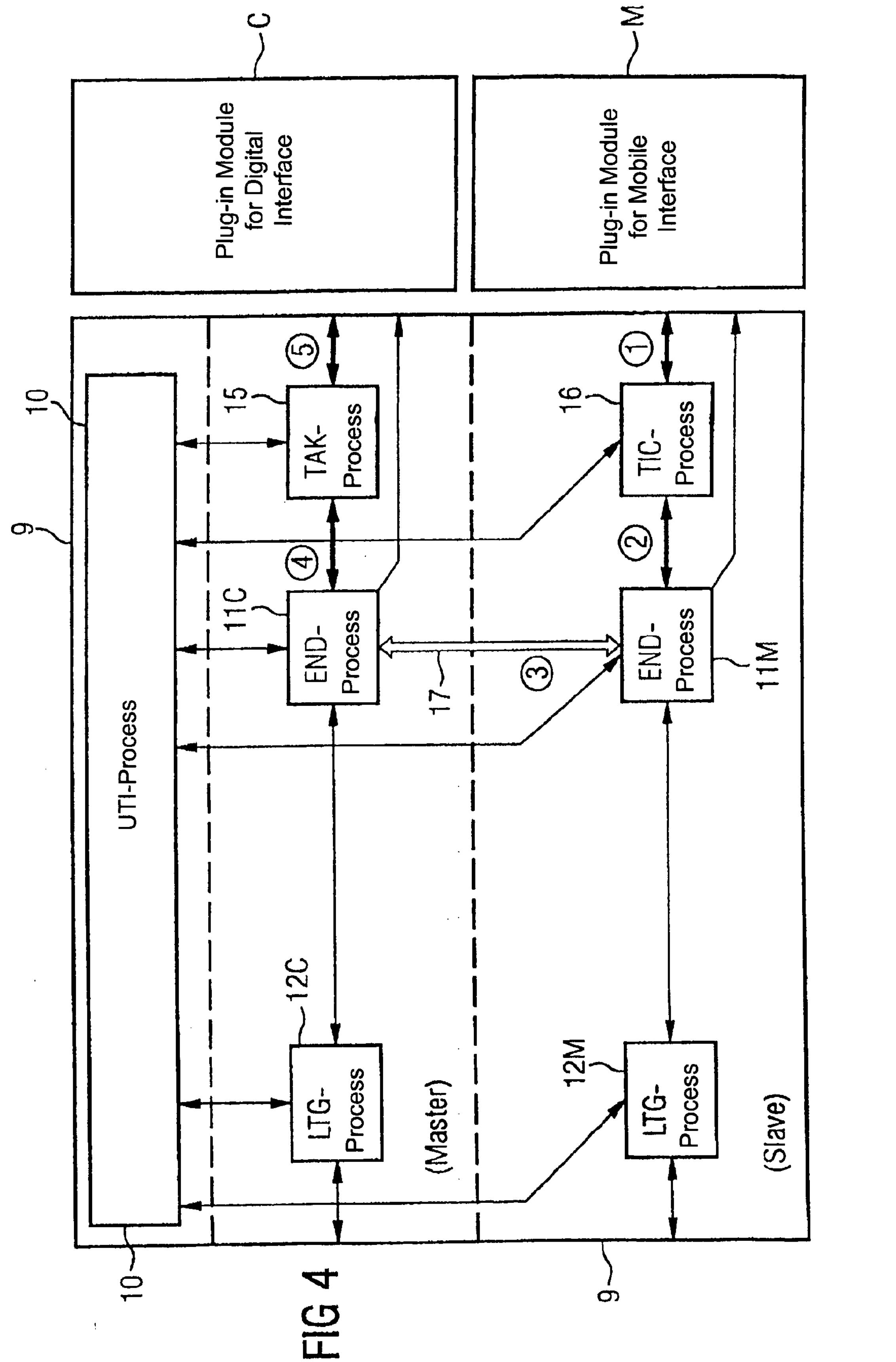
FIG. 4 is a schematic block circuit diagram of the inventive interface driver in the synchronization of an internal performance feature.

FIG. 4 shows a schematic block circuit diagram of the inventive interface driver 9 given the synchronization of an internal telecommunication performance feature. According to FIG. 4, a synchronization of performance features fundamentally ensues via the terminal device process units 11C and 11M of the subscriber terminal devices connected in parallel or the principal and subsidiary (master and slave) subscriber control pertaining thereto. The terminal device process units 11C and 11M are thereby logically connected to one another via the message interface 17. In the initialization phase (run-up) of the subscriber terminal devices connected in parallel, the information is thereby stored in the terminal device process units 11C and 11M such that it is respectively a matter of a principal terminal device process unit and a subsidiary terminal device process unit (TWIN Partners), as a result whereof a hierarchic order is defined. Further, addressing information is deposited during the initialization, this being needed in order to address the respective terminal device process unit of the pertaining subscriber device (connected in parallel).

According to FIG. 4, the synchronization of a telecommunications performance feature is shown that is only locally realized, i.e. internally in the interface driver 9, and does not require any communication with other modules or units of the private branch exchange 1.

For example, a performance feature is activated at the cordless subscriber terminal device (mobile telephone) MT via the selection of a specific menu point (for example, call distribution in the top team on). A functional message is routed ① to the key converter process unit (TIC process) from the cordless subscriber terminal device MT via the pertaining base station MB to the corresponding subscriber interface M (mobile subscriber insert). The key converter process unit 16 edits the functional message of the subscriber interface M (for example, "soft key 1 was pressed") and sends a logical message (for example, call distribution on) to its own terminal device process unit 11 M ②). The performance feature (call distribution in top team on) is now implemented in the terminal device process unit 11M of the subsidiary subscriber control (mobile telephone) and the new status of the subscriber terminal device is stored. It is also found that the cordless subscriber terminal device MT is a matter of a subscriber in a parallel circuitry configuration (TWIN configuration), and a logical message is sent ③ via the message interface 17 that contains the logical message to activate the call distribution.

The terminal device process unit 11C of the subscriber terminal device TEC connected in parallel (TWIN partner) now likewise processes this logical message and activates the corresponding performance feature. At the same time, the new condition or status is deposited in its local data memory. Further, it is found in the terminal device process unit 11C that a key function is allocated to this performance feature, for which reason a logical message is sent ④ to the key converter process unit 15. According to this logical message, a key having the key function "call distribution" should be sought in the key data of the key converter process unit 15 and the pertaining LED should be turned on. Accordingly, the key converter process unit 15 searches the key data and, when a corresponding key function is found, switches the corresponding LED at the wire-bound subscriber terminal device on ⑤ via a functional message (for example, "switch the seventh LED at the subscriber terminal device").

With the activation of the performance feature at the cordless subscriber terminal device MT, accordingly, the corresponding performance feature is activated at the subscriber device TEC connected parallel (TWIN partner) and is also potentially signaled.

Figure 5:
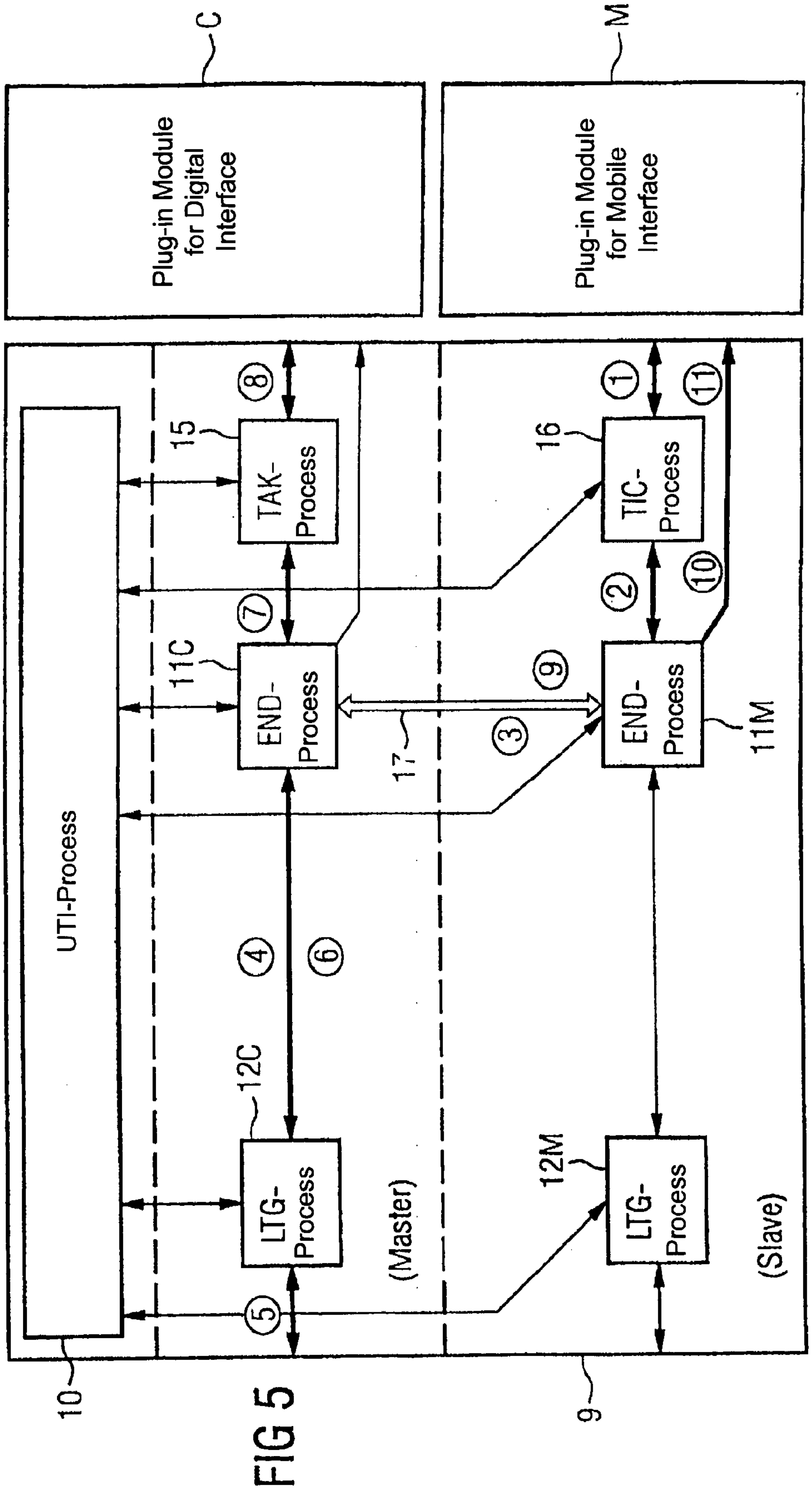
FIG. 5 is a schematic block circuit diagram of the inventive interface driver in the synchronization of an external performance feature.

FIG. 5 shows a schematic block circuit diagram of the inventive interface driver 9 given the synchronization of an external telecommunication performance feature.

In contrast to FIG. 4, the executive sequence for the activation of a performance feature that is not realized within the interface driver 9 is shown in FIG. 5; rather this is located in other units of the private branch exchange 1 or in an external server or computer.

This case, accordingly, requires a communication with other units within the private branch exchange 1. For example, a performance feature is selected at the cordless subscriber terminal device MT (mobile telephone) via the selection of a menu point (for example, station guarding on). In the same way as in the synchronization process according to FIG. 4, a functional message is first routed ① to the key converter process unit (TIC process) 16 from the cordless subscriber terminal device MT via the base station MB and the pertaining subscriber interface M. The functional message of the subscriber interface M (for example, soft key 2 was pressed) is again edited in the key converter process unit 16 and is sent ② to the terminal device process unit 11M as logical message (for example, station guarding on).

It is then found in the terminal device process unit 11M that this performance feature is not realized in the interface driver 9. It is also found that the cordless subscriber terminal device MT is a matter of a subscriber terminal device in a parallel circuitry configuration (TWIN configuration). Dependent on its hierarchic order, the terminal device process unit 11M sends a logical message via the message interface 17 to the terminal equipment process unit 11C of the principal subscriber control ③. The terminal device process unit 11C now processes the logical message (for example, station guarding on), whereby it is likewise found that this performance feature is not realized in the interface driver 9. The terminal device process unit 11C therefore sends a corresponding logical message ④ via the line process unit 12C to the central control unit 5 of the private branch exchange 1 or the module of the private branch exchange 1 that controls this performance feature) ⑤. The central control unit 5 acknowledges the activation of the performance feature, whereby the acknowledgment is routed back ⑥ to the terminal device process unit 11C via the line process unit 12C of the principal subscriber control.

The terminal device process unit 11C now receives the logical message of the central control unit 5, in accord wherewith the performance feature "station guarding" was activated. With reference to the condition or status of the terminal device process unit 11C and the information in its local data, in accord wherewith it is a matter of a principal subscriber connected in parallel, the terminal device process unit 11C recognizes that the performance feature "station guarding" was activated by the pertaining subsidiary subscriber control. The terminal device process unit 11C of the principal subsidiary control now stores the information that the performance feature "station guarding" was activated in its local data memory.

It is also found in the terminal device process unit 11C that a key function is allocated to this performance feature. Accordingly, a logical message is sent ⑦ to the key converter process unit 15. The information is contained in this logical message that a key with the key function "station guarding" should be sought in the key data of the key converter process unit 15 and the pertaining LED should be activated at the wire-bound subscriber terminal device TEC. When the key converter process unit 15 has found a corresponding key function, it sends a functional message to the corresponding LED in the wire-bound subscriber device (for example, functional message "switch the ninth LED at the subscriber terminal device") ⑧.

Since the terminal device process unit 11C is a matter of a process unit connected in parallel having a higher-ranking hierarchy (TWIN master), the logical message for activating the performance feature "station guarding" is subsequently routed ⑨ via the message interface 17 to the terminal device process unit 11M of the subsidiary subscriber control (TWIN slave). The terminal device process unit 11M of the subsidiary subscriber control, on the basis of its internal condition or status, now recognizes that it has activated this performance feature and can output + a positive acknowledgement for the activation of the station guarding in the display of the cordless subscriber terminal device MT.

The above-described invention thus makes it possible to operate a wire-bound subscriber terminal device and a cordless subscriber terminal device at a private branch exchange such that both subscriber terminal devices TEC and MT can be reached under the same telephone number, i.e. an incoming call is simultaneously signaled at both subscriber terminal devices; the connection is through-connected to the subscriber terminal device that accepts the call; both subscriber terminal devices seize the same line, i.e. the telephone number of the wire-bound subscriber terminal device always appears in the display at the called party even when the call ensues from the cordless subscriber telephone device MT; the connection data acquisition ensues as an aggregate of both subscriber terminal devices; and, in addition to the physical call control, the telecommunications performance features for both subscriber terminal devices are also connected in parallel (for example, call reroutings, call back, caller list, mail functionality, fetch call, query connection costs, station guarding on, etc.).

Performance features of the private branch exchange, whose interconnection is not meaningful such as, for example, a do-not-disturb function can continue to be handled separately for the subscriber terminal devices connected in parallel.

The present invention was described above with reference to a cordless and a wire-bound subscriber terminal device. However, it is not limited thereto and, on the contrary, covers all types of subscriber terminal devices that can be operated at a switching device.

Further, the present invention was described with reference to a private branch exchange; however, it can also be applied to public exchange systems and other telecommunications switching devices.

Although modifications and changes may be suggested by those skilled in the art, it is the intention of the inventors to embody within the patent warranted hereon all changes and modifications as reasonably and properly come within the scope of their contribution to the art.

We claim as our invention:

1. A switching device for parallel connection of a plurality of subscriber terminal devices, said switching device comprising:

a plug-in module having a plurality of subscriber interfaces, each connected to one of the subscriber terminal devices; and a control unit having:

a central control unit for controlling central switching events in said switching device; and a peripheral control unit for controlling linking of said subscriber interfaces to said subscriber terminal devices, said peripheral control unit having an interface driver for controlling at least two of said subscriber interfaces, said interface driver having:

a master subscriber control unit for controlling a principal subscriber terminal device;

at least one subsidiary subscriber control unit for controlling at least one subsidiary subscriber terminal device;

a central driver control unit for central controlling of administration events in said interface driver;

a first connection device physically connecting said master subscriber control unit and said at least one subsidiary subscriber control unit; and a second connection device logically connecting said master subscriber control unit to said at least one subsidiary subscriber control unit separately from said first connection device.

2. The switching device according to claim 1, wherein said master subscriber control unit comprises:

a first line process unit for linking to said central control unit;

a first connection process unit for controlling a connection setup for a first subscriber terminal device;

a first terminal device process unit for generating logical messages for controlling the first subscriber terminal device; and a first key converter process unit for converting said logical messages into functional messages for direct control of the first subscriber terminal device; and wherein said subsidiary subscriber control unit comprises:

a second line process unit for linking to said central control unit;

a second connection process unit for controlling a connection setup for a second subscriber terminal device;

a second terminal device process unit for generating logical messages for controlling the second subscriber terminal device; and a second key converter process unit for converting said logical messages into functional messages for direct control of the second subscriber terminal device.

3. The switching device according to claim 2, wherein said first connection device comprises an internal connection process unit for physically connecting said first connection process unit to said second connection process unit.

4. The switching device according to claim 2, wherein said second connection device comprises a message interface for logically connecting said first terminal device process unit to said second terminal device process unit.

5. The switching device according to claim 1, wherein the subscriber terminal devices are connected in parallel to said switching device and include at least one digital wire-bound subscriber terminal device and a cordless subscriber terminal device, and wherein said switching device is a private branch exchange.

* * * * *